Patented June 15, 1926.                                          1,588,482

UNITED STATES PATENT OFFICE.

JOSEPH MERRITT MATTHEWS, OF NEW YORK, N. Y., ASSIGNOR TO GLORIENT, INC., OF NEW YORK, N. Y., A CORPORATION OF NEW YORK.

DYE COMPOSITION.

No Drawing.        Application filed May 29, 1924.  Serial No. 716,573.

This invention relates to dye compositions and particularly to a self contained water soluble dry powder composition for household use in dyeing silk goods.

While there are a number of such compositions on the market for cotton, I am not aware of any especially for dyeing silk goods having the necessary requirements of fast dyeing by simple immersion and non hygroscopicity and stability when packaged for retail trade. Such an article should also be readily and completely soluble, and should not leave specks which tend to spot the goods.

According to this invention, a stable, water soluble dye composition powder accomplishing the above objects and having the above advantages is obtained by combining with an acid dye incapable of being precipitated by free acid or a leveling agent, a material supplying free acid in solution, and a leveling agent. A suitable acid supplying material is pure aluminum sulphate, or fumaric acid, and a suitable leveler is tartar (potassium bitartar or potassium bitartrate), neither of which precipitate dyes suitable for dyeing silk goods according to this invention. This invention is applicable to the dyeing of pure silk goods, or to goods in part of other fibres, a particular advantage of the invention being that the dyes used have no affinity in acid solution for vegetable fibre and consequently will not stain cotton, lace, etc. on silk garments.

A suitable composition, as for pink is:

|                          | Grams. |
|--------------------------|--------|
| Scarlet 2 R              | 3      |
| Fast crimson G R         | 3      |
| Pure aluminum sulphate   | 300    |
| Potassium bitartrate     | 100    |

These materials are mixed dry and ground into a uniform and very fine powder. The powder is then desiccated to remove moisture, and then packed and sealed in moisture proof paper envelopes for the market. These packages keep indefinitely in good condition without decomposition or caking.

The function of the aluminum sulphate is to release free acid in the solution and it also acts as a mordant on silk and helps to fix a faster color. It also makes the silk fibre more lustrous and gives it a body and a scroop that is desirable, especially in garments which are redyed after use. The tartar causes the color to be taken up more evenly and assists in mordanting the silk fibre. The proportion of aluminum sulphate may vary between limits, the amount employed depending on the particular dyes used and the depth of shade required. For heavy shades, up to 75 gr. of dye stuff may be used to 300 gr. of aluminum sulphate. Instead of aluminum sulphate, fumaric acid may be used, which works very well because of its stability in the mixture, and desirable acidity in solution.

This composition is completely soluble in warm or hot water without residue and does not leave specks on the goods. The hotter the water the better, as the color is more fast and penetrates better. The goods are first cleaned in neutral soap then washed several times in warm water to remove the soap.

The dyeing process takes from 10 to 25 minutes, depending on the depth of shade and color. The goods are finished after rinsing well in warm water and drying.

The use of dry soluble organic acid, such as fumaric acid is not claimed herein but is claimed in application filing November 8, 1924, Serial No. 748,768.

I claim:

1. A stable dry powder water soluble silk dye composition comprising an acid dye incapable of being precipitated in the presence of aluminum sulphate and potassium bitartrate, a dry water soluble material for supplying free acid when dissolved in the solution, and a dry water soluble leveling agent, said composition being readily and completely soluble in warm water and being nonhygroscopic and noncaking when packed.

2. A stable dry powder water soluble silk dye composition comprising an acid dye incapable of being precipitated in the presence of aluminum sulphate and potassium bitartrate, aluminum sulphate, and potassium bitartrate, said composition being readily and completely soluble in warm water and being nonhygroscopic and noncaking when packed.

Signed at New York in the county of New York and State of New York this 6th day of May A. D. 1924.

JOSEPH MERRITT MATTHEWS.